(12) United States Patent
Harrington (10) Patent No.: US 7,865,253 B2
(45) Date of Patent: Jan. 4, 2011

(54) SYSTEM AND METHOD FOR DETECTING SHAKES AND PERCUSSIVE IMPACTS AND FOR PROTECTING PORTABLE ELECTRONIC DEVICES WHEN PRE-SPECIFIED SHAKE PATTERNS AND PERCUSSIVE IMPACT LEVELS ARE DETECTED

(75) Inventor: Nathan J. Harrington, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 11/735,721

(22) Filed: Apr. 16, 2007

(65) Prior Publication Data

US 2008/0253015 A1 Oct. 16, 2008

(51) Int. Cl.
- *G01D 1/00* (2006.01)
- *G06F 15/00* (2006.01)
- *G06M 11/04* (2006.01)

(52) U.S. Cl. .................... 700/21; 702/127; 702/141
(58) Field of Classification Search ............. 702/124, 702/141
See application file for complete search history.

(56) References Cited

U.S. PATENT DOCUMENTS

| | | | | |
|---|---|---|---|---|
| 4,862,394 | A | * | 8/1989 | Thompson et al. .......... 702/166 |
| RE35,269 | E | | 6/1996 | Comerford |
| 5,763,982 | A | * | 6/1998 | Tabota et al. ................ 310/329 |
| 5,835,298 | A | | 11/1998 | Edgerton et al. |
| 6,046,877 | A | * | 4/2000 | Kelsic .......................... 360/75 |
| 6,484,109 | B1 | | 11/2002 | Lofall |
| 6,748,555 | B1 | * | 6/2004 | Teegan et al. .................. 714/38 |

(Continued)

FOREIGN PATENT DOCUMENTS

GB 2416036 A 1/2006

(Continued)

OTHER PUBLICATIONS

Sri-Jayantha, M., "Servo Angular Accelerometer for theta dotdot Detection and Measurement", IBM Technical Disclosure Bulletin, vol. 36, No. 6A, pp. 187-188, Jun. 1993.

(Continued)

*Primary Examiner*—Albert DeCady
*Assistant Examiner*—Sunray R Chang
(74) *Attorney, Agent, or Firm*—Anna L. Linne; Hoffman Warnick LLC (57) ABSTRACT

A system and method detects low grade physical motions of an electronic device, such as a laptop computer, and takes protective measures if the physical motions match a pre-specified physical motion pattern. The pre-specified physical motion pattern may have been selected as a pattern which, if left alone, could cause cumulative damage to the electronic device. Alternatively, the pre-specified motion pattern may have been selected as a pattern which tended to indicate that more aggressive and abrupt movements would be forthcoming. The system and method further detects sustained motion (such as in a laptop bag) such that the laptop may shut-off so that the laptop does not overheat or get damaged. The system and method may be configured such that a system administrator may be notified if laptop is being abused. In a similar manner, the history of the percussive impacts or movements may be kept or logged for future use.

18 Claims, 7 Drawing Sheets

U.S. PATENT DOCUMENTS

| | | | |
|---|---|---|---|
| 7,000,473 B2 * | 2/2006 | Vandemeer et al. | 73/514.32 |
| 7,059,182 B1 | 6/2006 | Ragner | |
| 7,161,758 B2 | 1/2007 | Adapathya et al. | |
| 7,450,332 B2 * | 11/2008 | Pasolini et al. | 360/75 |
| 2001/0024949 A1 * | 9/2001 | Yanagida et al. | 455/404 |
| 2004/0125493 A1 * | 7/2004 | Shimotono et al. | 360/75 |
| 2005/0088773 A1 | 4/2005 | Yoshida | |
| 2006/0152842 A1 * | 7/2006 | Pasolini et al. | 360/75 |
| 2007/0156679 A1 * | 7/2007 | Kretz et al. | 707/6 |

FOREIGN PATENT DOCUMENTS

| | | |
|---|---|---|
| JP | 2000-099182 | 4/2000 |

OTHER PUBLICATIONS

Khanna et al., "Palm Sensor for Handheld Computing Devices", IBM Technical Disclosure Bulletin, vol. 40, No. 12, pp. 225-228, Dec. 1997.

IBM, "Alarm by On-board Accelerometer Against Moving Notebook PC", IP.com No. IPCOM000019124D, pp. 1-2, Aug. 29, 2003.

IBM, "Lowest Power Mode Insted of Suspend by Detecting Notebook PC is being Transferred", IP.com No. IPCOM000124550D, Apr. 27, 2005.

* cited by examiner

Listing 1. Full panicShake subroutine

```
/*
 * panicShake - reboot the machine if shaken
 */
extern void panicShake(void)
{
int ret, x, y; // return value and x,y from hdaps
Int
int baseX = -5000; // off scale default values
int baseY = -5000;
int totalDev = 0; // running total of deviations from rest (shaking total)
int devThreshold = 4000; // larger threshold for more shaking
int dimShiftX = 150; // in case your users shake more in a certain dimension
int dimShiftY = 150;

while(1)
 {
  ret = hdaps_read_pair(HDAPS_PORT_XPOS, HDAPS_PORT_YPOS, &x, &y);
  if (!ret)
  {
   if( x != 0 && y != 0 )
   {
    // if its a successful read and not a zero read
    if( baseX == -5000 )
    {
     baseX = x;
     baseY = y;
    }
    if( abs(baseX - x) > dimShiftX || abs(baseY - y) > dimShiftY )
    {
     totalDev += abs(baseX - x);
     totalDev += abs(baseY - y);
    }
    if( totalDev > devThreshold )
    {
     printk(KERN_EMERG "ok, ok! you're shaking my substrate - restarting");
     emergency_restart();
    }
   }//if not a zero value
  }//if successful read of hdaps data
 }//infinite while
}//panicShake
```

```
* panicShake - reboot the machine if shaken
*/
extern void panicShake(void)
{
int ret, x, y; // return value and x,y from hdaps
Int
int baseX = -5000; // off scale default values
int baseY = -5000;                              300
int totalDev = 0; // running total of deviations from rest (shaking total)
int devThreshold = 4000; // larger threshold for more shaking
int dimShiftX = 150; // in case your users shake more in a certain dimension
int dimShiftY = 150;
```

306 → devThreshold
302 → dimShiftX
304 → dimShiftY

Figure 4

```
while(1)
{
402 → ret = hdaps_read_pair(HDAPS_PORT_XPOS, HDAPS_PORT_YPOS, &x, &y);
    if (!ret)
    {
        if( x != 0 && y != 0 )
        {
            // if its a successful read and not a zero read
            if( baseX == -5000 )
            {
404 →           baseX = x;
                baseY = y;
            }
```

```
if( $x != 0 >> $y != 0 )
{
    if( $baseX == -5000 )
    {
        $baseX = $x;
        $baseY = $y;
    }
    if( abs($baseX - $x) > $dimShiftX || abs($baseY - $y) > $dimShiftY )
    {
        $totalDev += abs($baseX -$x);
        $totalDev += abs($baseY -$y);
        $baseX = $x;
        $baseY = $y;
    }
    if( $totalDev > $devThreshold )
    {
        print "threshold passed $totalDev\n";
        my $res=`/sbin/shutdown -h 1`;
    }
    close(HD);
}
```

700

SYSTEM AND METHOD FOR DETECTING SHAKES AND PERCUSSIVE IMPACTS AND FOR PROTECTING PORTABLE ELECTRONIC DEVICES WHEN PRE-SPECIFIED SHAKE PATTERNS AND PERCUSSIVE IMPACT LEVELS ARE DETECTED

FIELD OF THE INVENTION

The present invention relates generally to shake detection and protection of portable electronic devices and, more specifically, to a system and method for detecting and protecting a portable electronic device when pre-specified shake patterns and levels are detected.

BACKGROUND OF THE INVENTION

It is well known that portable electronic devices—such as laptops computers, personal digital assistants (PDAs), cell phones and the like—are subject to extensive movements and, many times, to inadvertent drops and other unexpected impacts. This can cause damage to the portable electronic device. This is especially true for electronic devices, such as laptop computers, having hard disks or hard drives. A hard disk (commonly known as a HDD (hard disk drive) or hard drive (HD) and formerly known as a fixed disk) is a non-volatile storage device which stores digitally encoded data on rapidly rotating platters with magnetic surfaces. Hard disks were originally developed for use with computers. In the 21st century, applications for hard disks have expanded beyond computers to include digital video recorders, digital audio players, personal digital assistants, and digital cameras. In 2005, the first mobile phones to include hard disks were introduced by Samsung Group and Nokia. Hard disks record data by magnetizing a magnetic material in a pattern that represents the data. They read the data back by detecting the magnetization of the material. A typical hard disk design consists of a spindle which holds one or more flat circular disks called platters, onto which the data is recorded. The platters are made from a non-magnetic material, usually glass or aluminum, and are coated with a thin layer of magnetic material. The platters are spun at very high speeds. Information is written to a platter as it rotates past mechanisms called read-and-write heads that fly very close over the magnetic surface. The read-and-write head is used to detect and modify the magnetization of the material immediately under it. There is one head for each magnetic platter surface on the spindle, mounted on a common arm. An actuator arm (or access arm) moves the heads on an arc (roughly radially) across the platters as they spin, allowing each head to access almost the entire surface of the platter as it spins. The hard disk's read-write heads fly on an air bearing which is a cushion of air only nanometers above the disk surface.

Due to the close proximity of the read-write heads to the disk surface, it can be seen how easily the disk may be damaged by the read-write head if the device is dropped or moved rapidly and suddenly while the read-write head is performing an action on the disk. For example, a laptop user may be using his/her laptop computer on his/her lap and may inadvertently drop the laptop to the floor causing an impact to the laptop. Because the laptop was in use at the time of the drop, the read-write head is most likely to be in a position in close proximity to the disk at the time of impact causing the read-write head to impact the disk and, many times, causing fatal damage to the disk so that the data on the disk is not recoverable.

Computer manufacturers have taken steps to help resolve this problem. For example, IBM created a technology for their ThinkPad® line of laptop computers called the Active Protection System. When a sudden, sharp movement is detected by a built-in motion sensor, such as a triaxial accelerometer, in the ThinkPad laptop, internal hard disk heads automatically unload themselves into a parking zone (i.e., an area of the disk where no data is stored) to reduce the risk of any potential data loss or scratches made. (An accelerometer is an instrument for measuring acceleration, detecting and measuring vibrations, or for measuring acceleration due to gravity (inclination). A triaxial accelerometer is an accelerometer which can detect acceleration along all three axes.) Apple later also utilized this technology in their Powerbook, iBook, MacBook Pro, and MacBook line, known as the Sudden Motion Sensor.

These types of systems detect sudden dramatic changes of acceleration—such as when the laptop or other electronic device is dropped—and performs some protective action on the electronic device, such as parking the read-write head(s) or even deploying shock absorbers on the laptop or other electronic device. (E.g., shock absorbers may be deployed from the corners of the laptop (on which the laptop is likely to land) to damper the sudden shock of impact and dissipate the kinetic energy built up from the fall.) These types of systems can be effective for drops from the user's lap, for instance.

However, because these systems are designed to protect the device based upon impact primarily from a drop, i.e., gravity is the force causing the change in acceleration, the system is designed to identify sudden dramatic changes in acceleration, such as going from a zero acceleration to the acceleration of gravity, or 9.8 m/s$^2$ (32 ft/s$^2$). Designers of such systems choose not to lower the predetermined acceleration change threshold as, many times, laptops or other electronic devices are, for instance, intentionally moved from one spot to another. It would be undesirable to the user for the system to automatically shut down or have the disk self-park for such safe activities as this.

Because most systems are designed to protect laptops and other devices from impact as a result of free fall, the systems are basically designed to perform the protective action when the acceleration rate approaches the acceleration rate of gravity. However, there are times when another force, as opposed to gravity, causes the change in acceleration and resulting potentially damaging impact to the laptop or other device such that the systems of the prior art do not have time to perform the protective action such as parking the read-write head. For instance, a user may be having some troubles with his laptop and, out of frustration, shakes or even bangs the laptop. It may be that the movement from such a user shake or bang is so sudden that the protective systems of the prior art don't have time to protect the device from damage. However, many times, it may be predicted when a sudden violent movement is to happen. That is, when a user is having troubles with his laptop, his level of frustration may gradually increase and, likewise, the level of violence of his shakes or bangs may likewise increase until the level has reached a point where damage may be done to one or more laptop components. It would be desirable for a system to have the ability to predict a sudden violent physical movement by detecting patterns of low level physical movements indicative of a possible sudden violent movement and to take precautionary protective measures when such patterns are detected.

Furthermore, present systems only provide protection to one component—the hard disk. So, even if the systems of the prior art are able to protect the hard disk from the violent physical movement, other components of the portable electronic device may be subject to damage. It would be desirable for a system to protect other components—possibly selected based upon the level of violence of the physical movement or patterns of detected physical movement.

Furthermore, many components of various electronic devices may be damaged, not only by a single violent physical movement or impact, but through a cumulative effect of numerous physical movements. An example of this could be the frustrated user described above who continuously shakes his computer but, in this case, never reaching a level of violence high enough to reach the threshold to trigger the systems of the prior art to take protective measures. It would be desirable for a system to protect components which may become damaged due to cumulative physical movements by detecting a series of physical movements and taking protective measures based upon the detection of pre-specified patterns of physical movement.

Present systems can provide audio or visual feedback to the user based upon a percussive impact, as well as performing a full shutdown to limit further damage. But, such systems provide such feedback based upon a single impact rather than a series of impacts or a series of movements. It would be desirable for a system to be able to detect a series of movements or impacts and take action based upon the type and amount of such series of movements or impacts.

In view of the foregoing, a need exists to overcome these problems by providing a system and method for detecting and protecting a portable electronic device when pre-specified shake patterns and levels are detected.

BRIEF SUMMARY OF THE INVENTION

The present invention provides a system and method which detects low grade physical motions of an electronic device, such as a laptop computer, and takes protective measures if the physical motions match a pre-specified physical motion pattern. The pre-specified physical motion pattern may have been selected as a pattern which, if left alone, could cause cumulative damage to the electronic device. Alternatively, the pre-specified motion pattern may have been selected as a pattern which tended to indicate that more aggressive and abrupt movements would be forthcoming.

The present invention further provides a system and method for detecting sustained motion (such as in a laptop bag) such that the laptop may shut-off so that the laptop does not overheat.

The present invention further provides that the system and method may be configured such that a system administrator may be notified if laptop is being abused. In a similar manner, the history of the percussive impacts or movements may be kept or logged for future use.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system.

In 2003, IBM® started selling ThinkPad laptop computers with integrated accelerometers and associated software for a commercial operating systems to protect the hard disks when the ThinkPad is dropped. (An accelerometer is an instrument for measuring acceleration, detecting and measuring vibrations, or for measuring acceleration due to gravity (inclination or free fall).) Depending upon the measured acceleration by the accelerometers, the accelerometers emit signals corresponding to the detected acceleration. Modules, such as for the Linux kernel, may be developed to take advantage of these sensors.

This specification, describing the present invention, describes the process of modifying the Linux kernel to add an oft-demanded feature: feedback on physical input. When the Linux kernel panics, the user can shake the computer (or perform any number of other developer-configurable physical movements of the laptop), and the machine will reset.

Another aspect of the present invention are methods for performing a normal shutdown in nonpanic mode. For example, if the user inadvertently places the computer in a laptop bag still turned on, it would be desirable for the computer to detect a normal walking or driving motion and turn itself off to avoid inadvertent component damage or to avoid unintended battery run-down.

This specification assumes familiarity with the kernel build process, as well as experience with the inconsistencies among distributions when it comes to kernel compilation. For an introduction to the kernel build process, as well as some great examples on how to get started, see Kwan Love's Kernel Rebuild Guide and the HDAPS information on the Source-Forge webpage.

Figure 1:
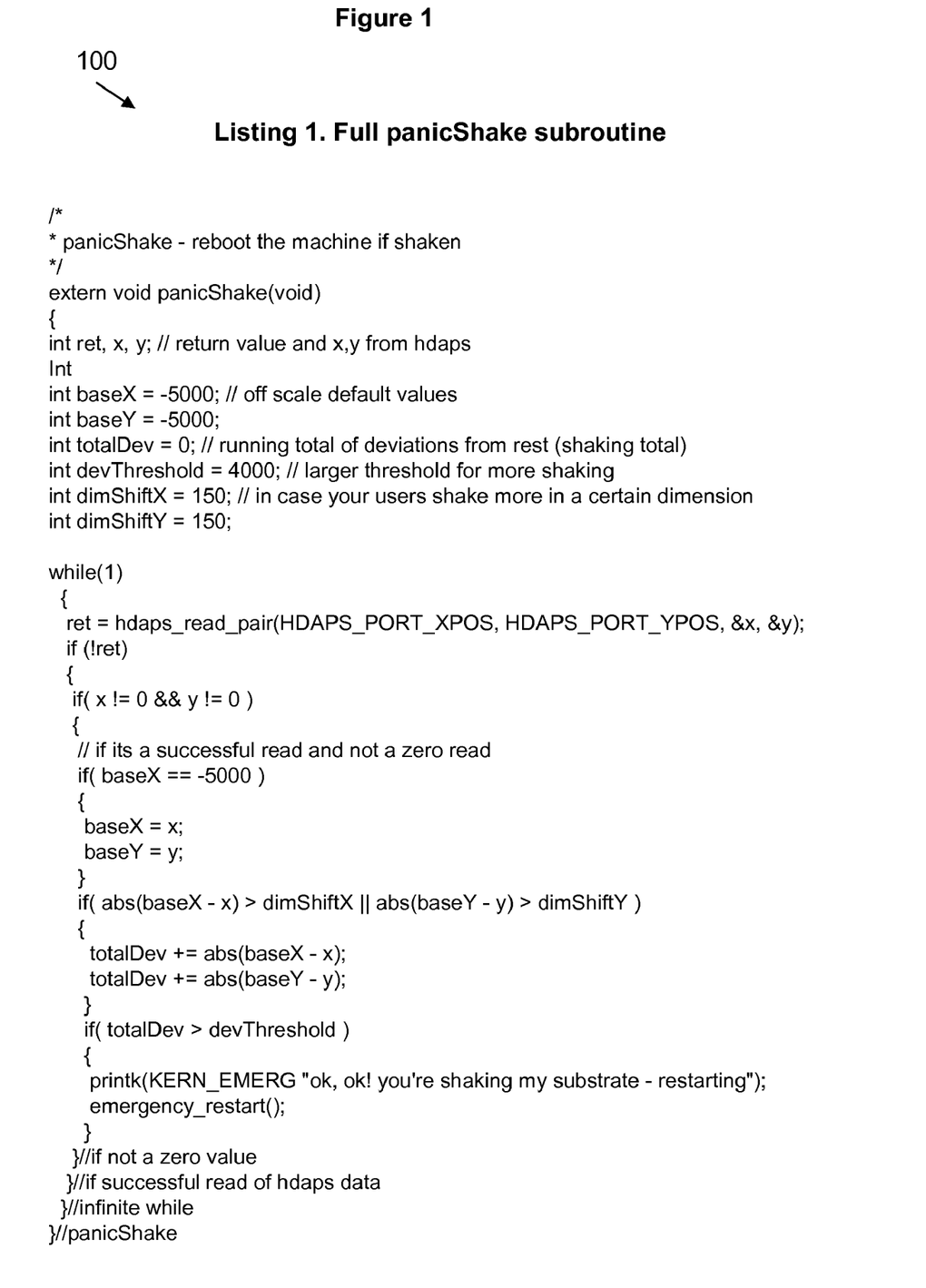
FIG. 1 illustrates a sample program ("the Full panicShake Subroutine process") for implementing the present invention.

FIG. 1 illustrates a sample program for implementing the present invention. This program (the "Full panicShake Subroutine") will be discussed in greater detail below in conjunction with accompanying figures.

Figure 2:
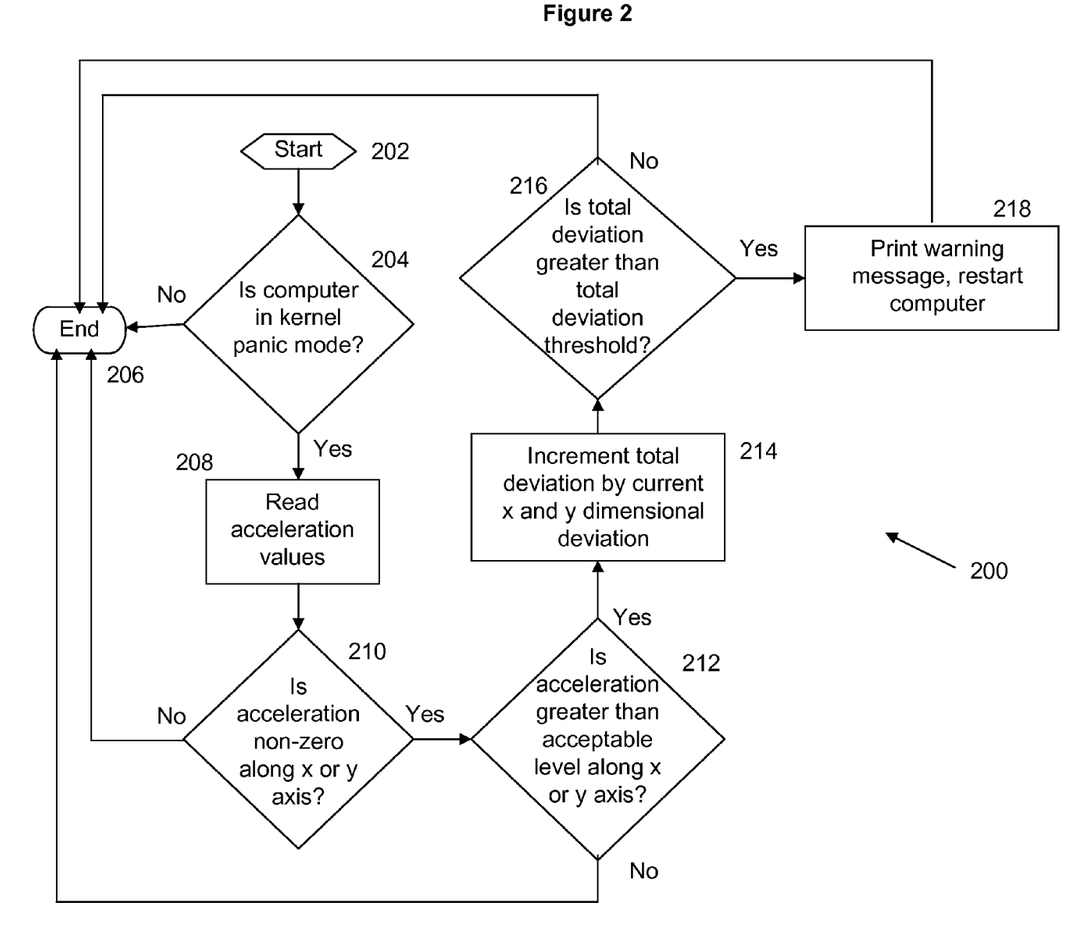
FIG. 2 illustrates a flowchart illustrating the Full panic-Shake Subroutine process.

FIG. 2 is a flowchart illustrating the Full panicShake Subroutine process 200. After Start 202, the process determines whether the computer is in kernel panic mode at 204. If not, the process ends at 206. If so, the process reads the acceleration values at 208. At 210, the process determines whether the acceleration values are non-zero along the x or y axis. If not, the process ends at 206. If so, at 212, the process determines whether the acceleration values are greater than the acceptable acceleration values along the x or y axis provided by the user. If not, the process ends at 206. If so, at 214, the process increments the total deviation by the current x and y dimensional deviation. At 216, the process determines whether the total deviation is greater than the total deviation threshold provided by the user. If not, the process ends at 206. If so, at 218, the process prints a warning message and resets the computer.

Figure 3:
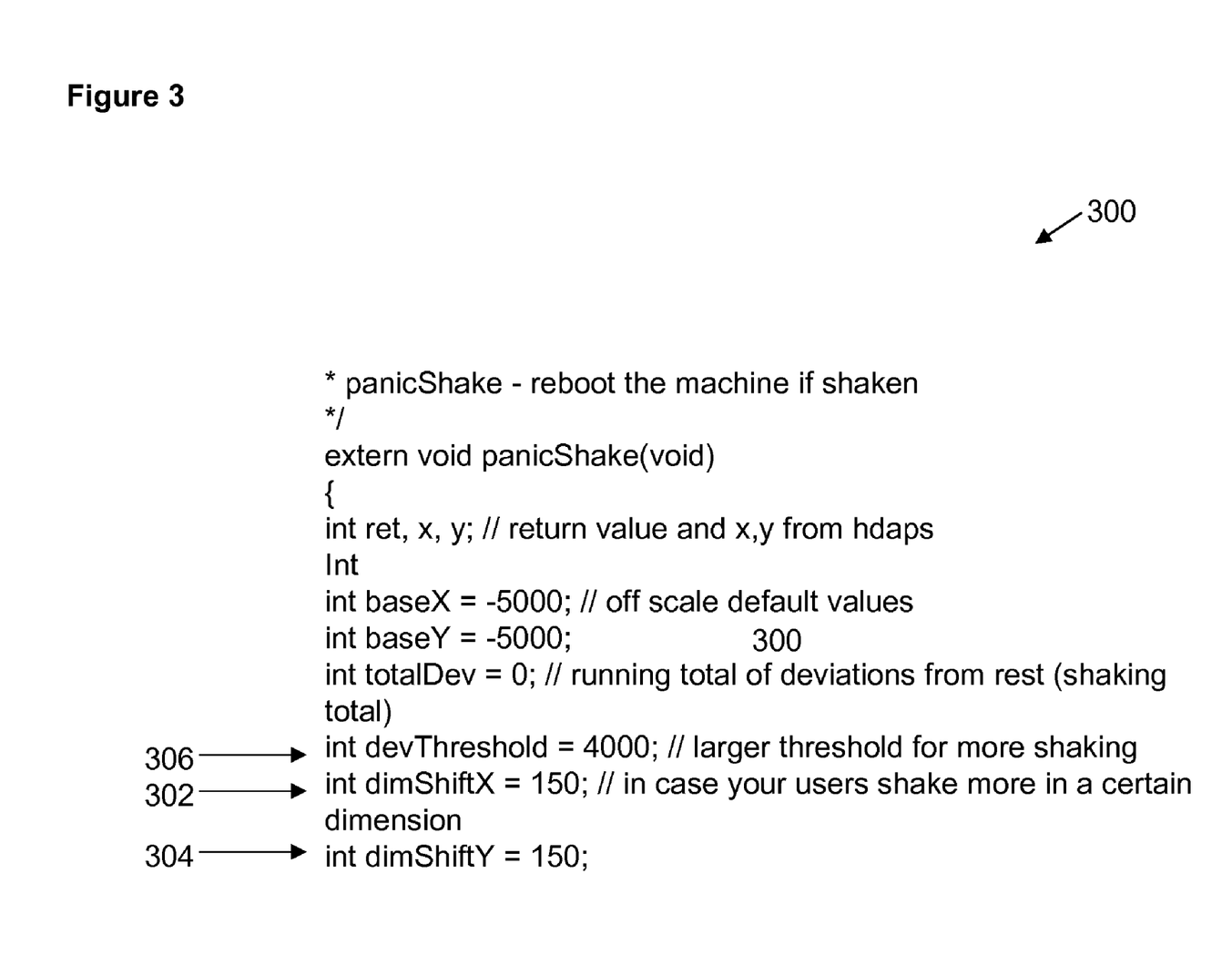
FIG. 3 illustrates the initial portion of the Full panicShake Subroutine process.

FIG. 3 illustrates the initial portion 300 of the Full panicShake Subroutine process. Of particular note is the deviation threshold parameter and the dimensional shift parameters. These may require tuning based on the unique characteristics of the motion which the user wishes to detect. For example, if user wishes more easily detect the shaking of his computer like he was performing a basketball pass, he would decrease the dimShiftX parameter 302 (the example shows the dimShiftX parameter value to be 150) to more easily detect motions perpendicular to the screen of the computer. Conversely, if wishes more easily detect motions of an up and down nature, the user would decrease the dimShiftY parameter 304 (the example shows the dimShiftX parameter value to be 150) to quickly pick up on shaking moments of frustration perpendicular to the computer and reset the user's computer before further damage can occur. The example shows only detection and calculations in the x and y directions but the invention could easily include detections and calculations in the z (side-to-side) direction as well.

The selections of 150 for dimensional parameters and 4000 for the total deviation 306 are designed to acquire the typical shaking motions of an average user. For immediate response to inputs, the user would decrease the dimensional shift parameters (dimShiftX, dimShiftY) to 10 or less and a total deviation parameter (devThreshold) of 10 or less. These values will cause other types of inputs to be immediately recognized, such as bashing the keyboard in frustration or smacking the display case in abject disgust.

Figure 4:
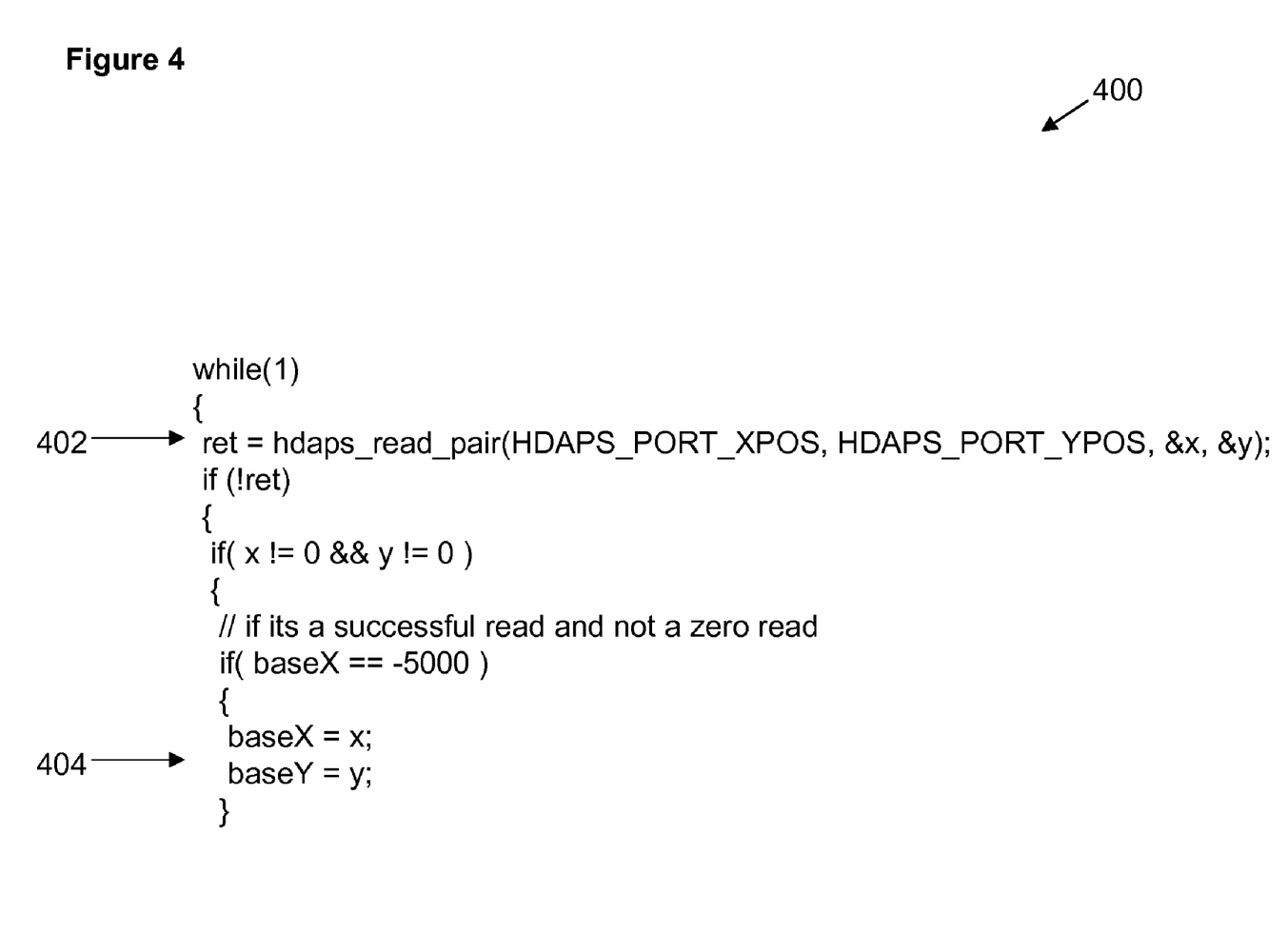
FIG. 4 illustrates the portion of the Full panicShake Subroutine process which considers infinite loop statement and conditionals.

FIG. 4 illustrates the portion 400 of the Full panicShake Subroutine process which considers infinite loop statement and conditionals. The code works as follows: for the rest of time, read the current accelerometer readings from the hdaps sensor at 402. Frequently, the read will be unsuccessful or both values will be equal to 0,0, which is unusable data. Such spurious 0,0 readings, which occur as often as one out of every 10 readings at any orentation of the sensor will be 0,0, need to be avoided. If it is the first "successful" read, at 404, the process sets the base parameters equal to the first x and y values. This allows the process to more robustly detect shaking or other movements if the panic occurred while the machine was on a nonflat surface, such as a person's knees.

Figure 5:
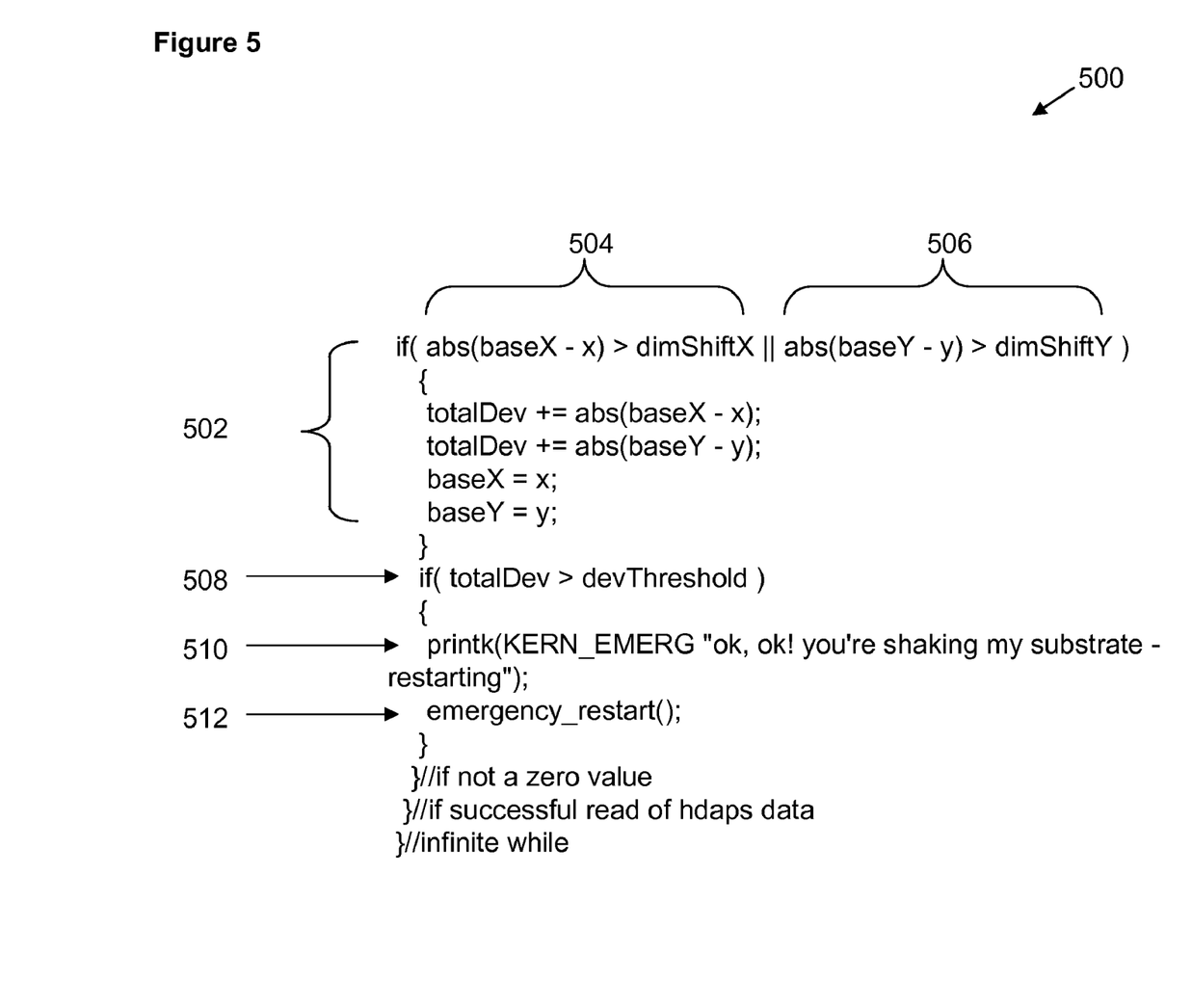
FIG. 5 illustrates the portion of the Full panicShake Subroutine process which detects shakes having dimensional shifts in either direction greater than previously set thresholds.

FIG. 5 illustrates the portion 500 (the "panicShake shake detection portion") of the Full panicShake Subroutine process which detects shakes having dimensional shifts in either direction greater than previously set thresholds. At 502, the process determines whether dimensional shifts in either direction are greater than previously set thresholds 504, 506, increment the total deviation by the amount moved in both directions. Then set the current base to the existing level of acceleration. This repeated reinitialization of the base values will require the user to continuously exceed the dimensional shift values to increment the total deviation detected. This is useful for allowing the user to move and store the ThinkPad in panic mode as they track down the systems administrator. If the user wishes the laptop to restart by simply setting the laptop on its side or tilting it and holding it there, the user would remove the reinitialization assignments. At 508, if the total deviation (totalDev) is greater than the deviation threshold (devThreshold), at 510, a message ("ok, ok! You're shaking my substrate—restarting") is printed and, at 512, the computer is restarted.

Figure 6:
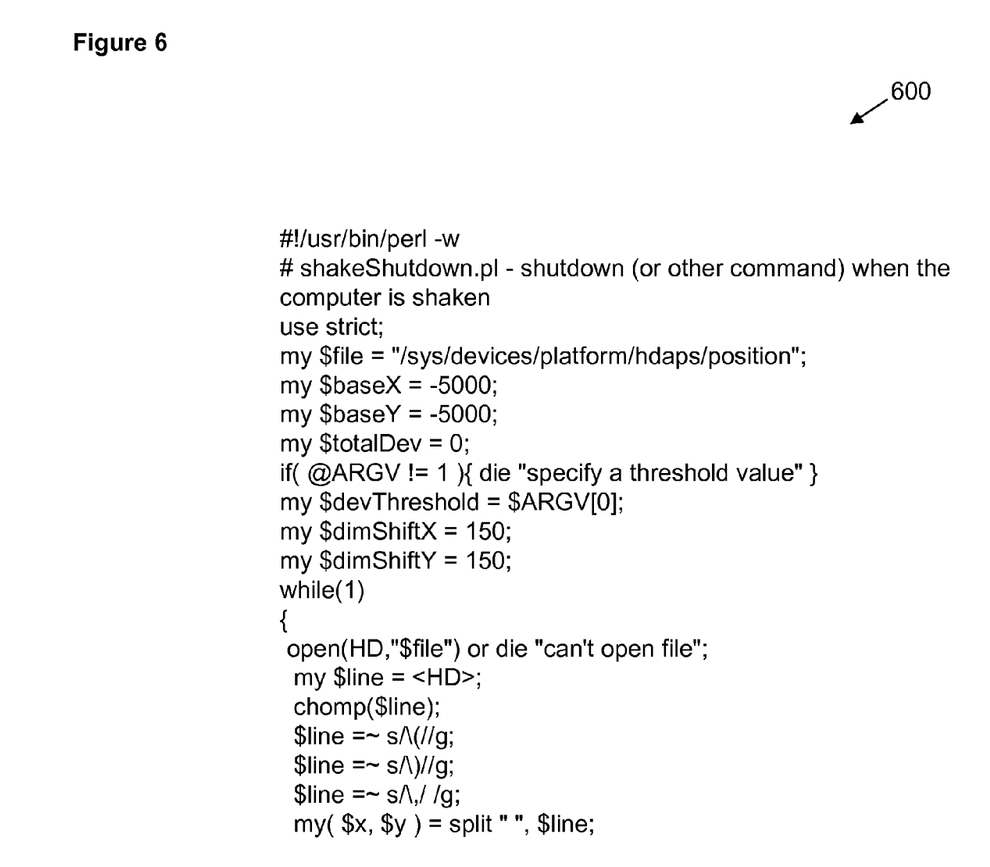
FIG. 6 illustrates a Perl script to shut down the machine gracefully when shaken by the user.
Figure 7:
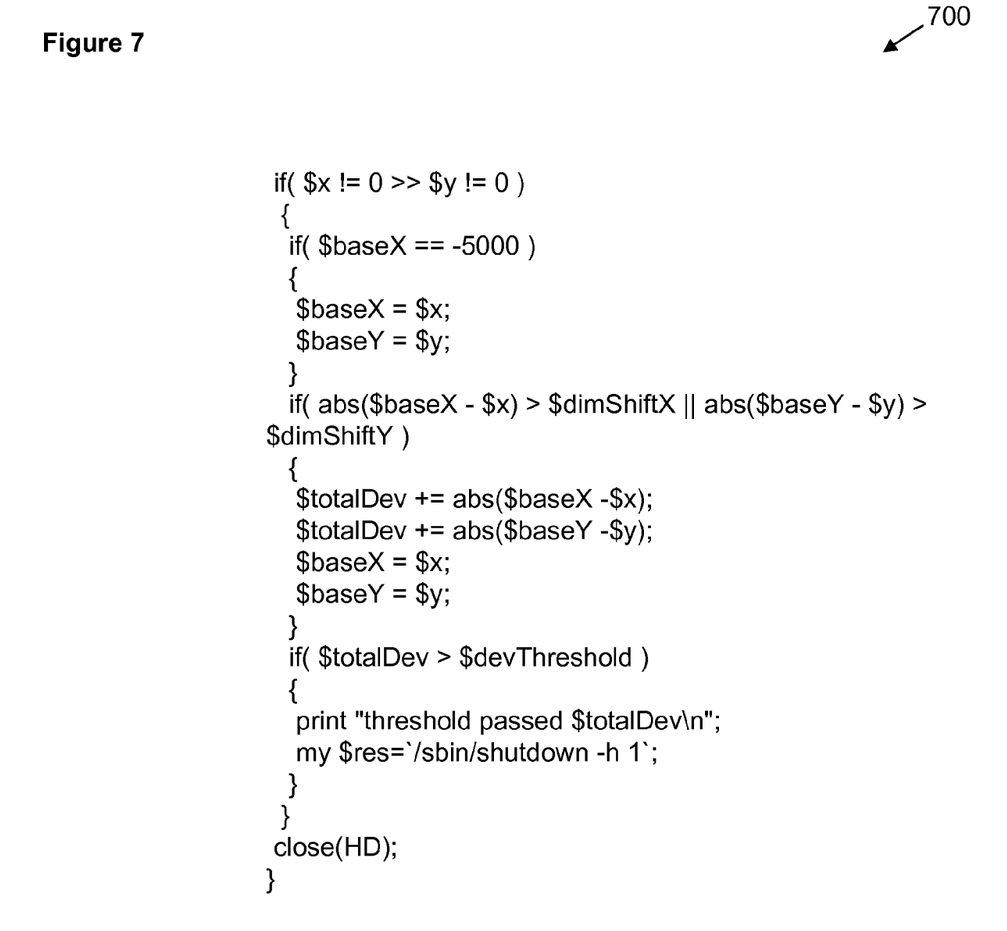
FIG. 7 illustrates the second part of the Perl script to shut down the machine gracefully when shaken by the user.

Many an IT administrator has yearned for the ability to know the physical history of hardware. With the same simple shake-detection algorithm described above, a Perl script, and a monitoring policy, administrators will be better able to track the status of their hardware. FIGS. 6 and 7 illustrate a Perl script 600/700 to shut down the machine gracefully when shaken by the user. Modifications can be made easily to send an e-mail, flash the "ThinkLight," or play a sound file based on the user's manipulation of the ThinkPad. Likewise, a history log can be kept tracking the percussive impacts or the various accelerations of the laptop or other electronic device so that the administrator may review the log at a later time.

As can be seen, the initial program setup is nearly identical to the hdaps kernel code. The regular expressions and split commands simply change the x and y values from (5,4) to 5 and 4. The remainder of the program is also virtually identical:

Note the shutdown –h 1 command. This will give the user 60 seconds to change his ways and issue a shutdown abort. This command can be changed to run the user's favorite mailer, and the user can let his systems administrator know when the user is abusing equipment. Messages can be logged to the system log or sound the PC speaker for instant user feedback about getting physical. The script can be run with the command perl shakeShutdown.1p 1000. The muchsmaller deviation threshold is due to the decreased number of reads-per-time interval of the accelerometer compared with the number of reads-per-time interval in kernel space.

Modifying the dimensional shift parameters and the deviation threshold can provide for additional useful monitoring of physical activities outside kernel space. For example, to acquire a "walking" behavior, the dimensional shift parameters can be set to around 20 and the deviation threshold set to around 5000. This will pick up about 63 dual-axis dimensional shifts, consistent with the laptop being running while in an over-the-shoulder typical laptop bag. After a long walk is detected (as opposed to a short walk between cube and conference), the machine will enter shutdown to prevent overheating while the airflow is confined in the carrying case. The dimensional shift parameters may be modified to be highly sensitive, and every significant bump, drop, or shake can be recorded.

With these simple algorithms for user space and kernel-level code, the user has the ability to detect, log, and respond to the full range of physical input from the user. With these code examples, the user can do everything from modifying hard-drive performance parameters based on computed altitude from continuous acceleration to tracking the number of steps from the user's cubicle to the conference room and mail it to the user's space planner.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for protecting a portable electronic device having at least one accelerometer therein, the at least one accelerometer for detecting acceleration of the portable electronic device in at least one direction, the method comprising the steps of:

a. monitoring, by an operating system of the portable electronic device, the at least one accelerometer, the at least one accelerometer providing at least one acceleration value corresponding to the acceleration of the portable electronic device;

b. determining, by the operating system, a deviation of the at least one acceleration value from a corresponding previously detected at least one acceleration value resulting in a corresponding at least one deviation value, wherein the at least one acceleration value and the corresponding at least one acceleration value are over a threshold acceleration value;

c. determining, by the operating system, whether the at least one deviation value is greater than a corresponding at least one pre-specified acceptable deviation value;

d. if so, incrementing a total deviation value by the at least one deviation value, wherein the total deviation value is a cumulative value of any previous contemporaneous deviation values;

e. determining, by the operating system, whether the total deviation value is greater than a pre-specified acceptable total deviation value; and f. if so, taking protective action on the portable electronic device.

2. The method of claim 1 further comprising, after step e, displaying a message on the portable electronic device.

3. The method of claim 1 further comprising, after step e, the step of sending an email to an IT administrator.

4. The method of claim 1 further comprising, after step c, if the at least one deviation value is greater than a corresponding at least one pre-specified acceptable deviation value, recording the at least one deviation value in a log.

5. The method of claim 1 comprising the step of allowing the at least one pre-specified acceptable deviation value to be modified.

6. The method of claim 1 comprising the step of allowing the at least one pre-specified acceptable total deviation value to be modified.

7. A computer software program comprising program code stored on a computer-readable medium, which when executed, enables a computer system to implement a method for protecting a portable electronic device having at least one accelerometer therein, the at least one accelerometer for detecting acceleration of the portable electronic device in at least one direction, the method comprising the steps of:

a. monitoring the at least one accelerometer, the at least one accelerometer providing at least one acceleration value corresponding to the acceleration of the portable electronic device;

b. determining a deviation of the at least one acceleration value from a corresponding previously detected at least one acceleration value resulting in a corresponding at least one deviation value, wherein the at least one acceleration value and the corresponding at least one acceleration value are over a threshold acceleration value;

c. determining whether the at least one deviation value is greater than a corresponding at least one pre-specified acceptable deviation value;

d. if so, incrementing a total deviation value by the at least one deviation value, wherein the total deviation value is a cumulative value of any previous contemporaneous deviation values;

e. determining whether the total deviation value is greater than a pre-specified acceptable total deviation value; and f. if so, taking protective action on the portable electronic device.

8. The computer program of claim 7 further comprising, after step e, displaying a message on the portable electronic device.

9. The computer program of claim 7 further comprising, after step e, the step of sending an email to an IT administrator.

10. The computer program of claim 7 further comprising, after step c, if the at least one deviation value is greater than a corresponding at least one pre-specified acceptable deviation value, recording the at least one deviation value in a log.

11. The computer program of claim 7 comprising the step of allowing the at least one pre-specified acceptable deviation value to be modified.

12. The computer program of claim 7 comprising the step of allowing the at least one pre-specified acceptable total deviation value to be modified.

13. A portable electronic device comprising a computer software program comprising program code stored on a computer-readable medium, which when executed, enables a computer system to implement a method for protecting the portable electronic device having at least one accelerometer therein, the at least one accelerometer for detecting acceleration of the portable electronic device in at least one direction, the method comprising the steps of:

a. monitoring the at least one accelerometer, the at least one accelerometer providing at least one acceleration value corresponding to the acceleration of the portable electronic device;

b. determining a deviation of the at least one acceleration value from a corresponding previously detected at least one acceleration value resulting in a corresponding at least one deviation value, wherein the at least one acceleration value and the corresponding at least one acceleration value are over a threshold acceleration value;

c. determining whether the at least one deviation value is greater than a corresponding at least one pre-specified acceptable deviation value;

d. if so, incrementing a total deviation value by the at least one deviation value, wherein the total deviation value is a cumulative value of any previous contemporaneous deviation values;

e. determining whether the total deviation value is greater than a pre-specified acceptable total deviation value; and f. if so, taking protective action on the portable electronic device.

14. The portable electronic device of claim 13 wherein the computer program further comprises, after step e, displaying a message on the portable electronic device.

15. The portable electronic device of claim 13 wherein the computer program further comprises, after step e, the step of sending an email to an IT administrator.

16. The portable electronic device of claim 13 wherein the computer program further comprises, after step c, if the at least one deviation value is greater than a corresponding at least one pre-specified acceptable deviation value, recording the at least one deviation value in a log.

17. The portable electronic device of claim 13 wherein the computer program further comprises the step of allowing the at least one pre-specified acceptable deviation value to be modified.

18. The portable electronic device of claim 13 wherein the computer program further comprises the step of allowing the at least one pre-specified acceptable total deviation value to be modified.

* * * * *